(12) United States Patent
Evangelinakis et al.

(10) Patent No.: US 10,057,857 B2
(45) Date of Patent: Aug. 21, 2018

(54) SYSTEM POWER MANAGEMENT AND OPTIMIZATION IN TELECOMMUNICATION SYSTEMS

(71) Applicant: NOKIA SOLUTIONS AND NETWORKS OY, Espoo (FI)

(72) Inventors: Dimitrios Evangelinakis, Athens (GR); Dimitrios Skraparlis, Athens (GR)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 0 days.

(21) Appl. No.: 15/506,930

(22) PCT Filed: Aug. 28, 2014

(86) PCT No.: PCT/EP2014/068258
§ 371 (c)(1),
(2) Date: Feb. 27, 2017

(87) PCT Pub. No.: WO2016/029950
PCT Pub. Date: Mar. 3, 2016

(65) Prior Publication Data
US 2017/0251433 A1  Aug. 31, 2017

(51) Int. Cl.
| | |
|---|---|
| H01Q 11/12 | (2006.01) |
| H04W 52/02 | (2009.01) |
| H04W 24/02 | (2009.01) |
| G06F 1/32 | (2006.01) |
| G06F 11/30 | (2006.01) |

(52) U.S. Cl.
CPC ...... *H04W 52/0261* (2013.01); *G06F 1/3206* (2013.01); *G06F 11/3062* (2013.01); *H04W 24/02* (2013.01); *H04W 52/0206* (2013.01); *H04W 52/0251* (2013.01)

(58) Field of Classification Search
USPC ....................................... 455/127.1, 572–574
See application file for complete search history.

(56) References Cited

U.S. PATENT DOCUMENTS

| 5,560,022 A | 9/1996 | Dunstan et al. |
| 6,006,335 A | 12/1999 | Choi et al. |
| (Continued) | | |

OTHER PUBLICATIONS

International Search Report and Written Opinion dated May 26, 2015 corresponding to International Patent Application No. PCT/EP2014/068258.

*Primary Examiner* — Lana N Le
(74) *Attorney, Agent, or Firm* — Squire Patton Boggs (US) LLP

(57) ABSTRACT

It is described a method (700) for reducing power consumption in a telecommunication system, the method (700) comprising: collecting (704) system data from at least a part of a plurality of subsystems (518) of the telecommunication system; determining a set of system constraints corresponding to the collected system data for at least the part of the plurality of subsystems (518); determining a configuration for at least the part of the plurality of subsystems (518) based on the collected system data so that a total power consumption for at least the part of the plurality of subsystems (518) is reduced and the determined set of system constraints is met; and applying (712) the determined configuration to at least the part of the plurality of subsystems to enforce the determined configuration.

19 Claims, 10 Drawing Sheets

(56) References Cited

U.S. PATENT DOCUMENTS

| | | | |
|---|---|---|---|
| 6,584,330 B1 | 6/2003 | Ruuska | |
| 6,711,691 B1 | 3/2004 | Howard et al. | |
| 6,883,102 B2 | 4/2005 | Williams, III et al. | |
| 7,108,468 B2 | 9/2006 | Till et al. | |
| 7,441,135 B1 | 10/2008 | Chan et al. | |
| 7,603,571 B2 * | 10/2009 | Sauber | G06F 1/28 |
| | | | 713/300 |
| 7,904,115 B2 * | 3/2011 | Hageman | H04W 52/0261 |
| | | | 455/127.1 |
| 7,917,625 B1 | 3/2011 | Cook | |
| 7,925,426 B2 | 4/2011 | Koebler et al. | |
| 8,055,828 B2 | 11/2011 | Conti et al. | |
| 8,078,894 B1 * | 12/2011 | Ogami | G06F 1/3203 |
| | | | 713/300 |
| 9,419,712 B2 * | 8/2016 | Heidler | H04B 10/11 |
| | | | 455/572 |
| 2004/0062231 A1 * | 4/2004 | Wyatt | H04L 29/06027 |
| | | | 455/574 |
| 2010/0070784 A1 * | 3/2010 | Gupta | G06F 1/3203 |
| | | | 713/310 |
| 2011/0055611 A1 * | 3/2011 | Sharma | H04L 45/00 |
| | | | 713/324 |
| 2012/0076003 A1 | 3/2012 | Wong | |
| 2012/0185707 A1 | 7/2012 | Chen et al. | |
| 2013/0061082 A1 | 3/2013 | Gardelegen et al. | |
| 2014/0092799 A1 * | 4/2014 | Jain | H04W 4/70 |
| | | | 370/311 |
| 2015/0003311 A1 * | 1/2015 | Feuersaenger | H04W 52/0225 |
| | | | 370/311 |

* cited by examiner

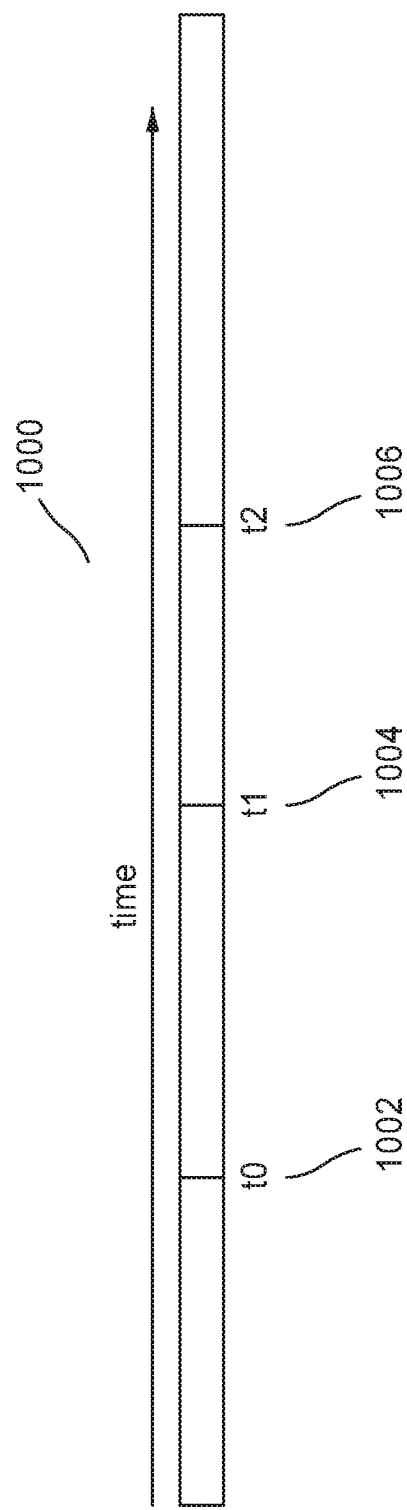

SYSTEM POWER MANAGEMENT AND OPTIMIZATION IN TELECOMMUNICATION SYSTEMS

FIELD OF INVENTION

The present invention relates to the field of system power management and optimization in telecommunication systems. In particular, the invention provides decision modules to decide how to allocate traffic handling among subsystems of a telecommunication system while reducing a total power consumption of the telecommunication system.

ART BACKGROUND

Energy efficiency, "greenness" and sustainability are important issues in the telecommunications industry. It has been shown that energy costs may consume 10-15% of the total operating expenses (OPEX) in mature markets and up to 50% in developing markets with high proportion of off-grid sites. Especially in the context of an ISO (International Organization for Standardization) 50001 certification and potential energy efficiency goals, operators as well as telecom equipment providers may be required to reduce their energy footprint and related carbon dioxide ($CO_2$) emissions.

U.S. Pat. No. 7,904,115 shows a telecommunication apparatus comprising a plurality of traffic handling units and a plurality of power supply units powering the traffic handling units. Control means are provided for determining a power budget based on a power criterion. The control means activate an amount of traffic handling units and power supply units having a total power consumption equal to or less than the power budget. The power criterion for determining the power budget may comprise power related parameters, such as an amount of solar cell generated power, a charging condition of a backup battery, a value of a mains voltage, or a failure of a power supply unit of the apparatus.

Therefore, there may be a need for efficiently managing, in particular reducing, power consumption in telecommunication systems.

SUMMARY OF THE INVENTION

This need may be met by the subject matter according to the independent claims. Advantageous embodiments of the present invention are described by the dependent claims.

According to a first aspect of the invention there is provided a method for reducing power consumption in a telecommunication system. In particular, the reduction of power consumption may be determined in comparison with a telecommunication system in which a part or all of the subsystems run continuously without considering power reduction concepts. The method comprises collecting system data from at least a part of a plurality of subsystems of the telecommunication system. For example, the plurality of subsystems may have the same type or may have different types. A type of a subsystem may comprise a hardware configuration and/or a software configuration of the subsystem. The method may further comprise determining a set of system constraints corresponding to the collected system data for at least the part of the plurality of subsystems. For example, the set of system constraints may comprise 1, 2, 3, or more system constraints. The number of system constraints may also depend on the number of parameters included in a system specification of a particular subsystem and/or may depend on the number of variables included in the collected system data.

The method further comprises determining a configuration for at least the part of the plurality of subsystems based on the collected system data so that a total power consumption for at least the part of the plurality of subsystems is reduced and the determined set of system constraints is met. The total power consumption may be defined as the sum of power consumptions of at least a part or all of the plurality of subsystems. The method further comprises applying the determined configuration to at least the part of the plurality of subsystems to enforce the determined configuration. This may provide the advantage that the total power consumption may be reduced in a more flexible and more efficient manner. For example, by using the method as described above, a reduction of the total power consumption by 30% to 50% may be achieved.

According to an embodiment of the invention, the method may further comprise evaluating whether the determined configuration meets a predefined stability criterion, wherein the determined configuration is only applied if the determined configuration meets a predefined stability criterion. For example, a predefined stability criterion may refer to a non-interrupted communication on a user side. If the determined configuration most likely does not influence or interrupt the communication on the user side, the determined configuration may be evaluated as meeting the predefined stability criterion. In other words, the determined configuration may be a stable configuration of the telecommunication system. This may provide the advantage that the total power consumption of the telecommunication system may be reduced without influencing the stability of the system.

According to a further embodiment of the invention, the method may further comprise receiving a trigger signal to start collecting system data, wherein the trigger signal may be received periodically or based on an event. This may provide the advantage that resources for collecting system data and/or determining a configuration of the subsystem to reduce power consumption may only be required at specific points in time, and thus, fewer resources may be required for determining a reduction of the power consumption of subsystems.

According to a further embodiment of the invention, the system data may comprise a central processing unit load, and/or a network traffic load including a signaling traffic load and a user data traffic load, and/or a power consumption in an idle state and a power consumption corresponding to the central processing unit load and/or the traffic load. This may provide the advantage that the system data comprises current measurement data of at least some or each of the plurality of subsystems. Thus, a more accurate and comprehensive set of system data may be used for determining a configuration which may lead to a more efficient reduction of the power consumption of the plurality of subsystems.

Furthermore, the set of system constraints may comprise one or more overload thresholds such as a maximum processing load, a maximum network traffic load, and/or system limitations regarding the total power consumption. This may provide the advantage that only feasible configurations of the plurality of subsystems may be considered which may be able process the current load of the system according to the measured and collected system data. This may provide the further advantage that the method is dynamically adapted to the possible system limitations or system constraints of at least some or each of the plurality of subsystems.

According to a further embodiment of the invention, determining the set of constraints may comprise formulating an optimization problem. This may provide the advantage that the variable of the optimization problem may be dynamically adapted to the system constraints of at least some or each of the plurality of subsystems.

According to a further embodiment of the invention, the determining the configuration for at least the part of the plurality of subsystems may comprise directly solving the optimization problem using an exhaustive search, in particular an exhaustive search procedure. This may provide the advantage that the determining of the configuration may be simplified for a small number of subsystems, e.g. less than 20 subsystems.

According to a further embodiment of the invention, formulating the optimization problem may comprise defining the set of system constraints, and formulating an objective function of the optimization problem, wherein the objective function may minimize the total power consumption. This may provide the advantage that an optimal configuration of subsystems is determined which provides a minimal total power consumption of at least a part or all of the plurality of subsystems. This may enable a computation of a local and/or a global optimum regarding the power consumption of the telecommunication system. In particular, a global optimum may be achieved when all of the plurality of subsystems may be taken into account for formulating the optimization problem.

According to a further embodiment of the invention, the objective function may be based on the power consumption in an idle state of at least the part of the plurality of subsystems and the power consumption corresponding to the central processing unit load and/or the traffic load of at least the part of the plurality of subsystems. This may provide the advantage that a total power consumption for each subsystem of at least the part of the plurality of subsystems may be efficiently managed, e.g. reduced or optimized. Thus, a more accurate total power consumption may be determined for a variety of subsystems, e.g. subsystems having different hardware and/or software configurations which may have equal or different power consumption.

According to a further embodiment of the invention, determining a configuration for each of the plurality of subsystems may comprise solving the optimization problem by minimizing the objective function of the optimization problem with respect to the determined set of system constraints. This may provide the advantage that only a single total power consumption objective function may have to be minimized for determining an optimal configuration for at least some or each of the plurality of subsystems.

According to a further embodiment of the invention, evaluating whether the determined system configuration meets the predefined stability criterion may comprise determining whether a time trend of the collected system data indicates an increase or a decrease of the collected system data without fluctuation. This may provide the advantage that unstable system configurations, i.e. system configurations which show strong fluctuating system data, might not be enforced. Thereby, continuous re-configuration of the plurality of the subsystem may be avoided in short intervals, since re-configuration in short intervals may lead to an unstable system, i.e. a system which may interrupt or influence a communication on a user side.

According to a further embodiment of the invention, applying the determined configuration may comprise translating the determined configuration into one or more system commands for at least the part of the plurality of subsystems, and/or sending the one or more system commands to at least the part of the plurality of subsystems so that at least the part of the plurality of subsystems may remain operational when applying the determined configuration and/or configuring one or more cooling systems of at least the part of the plurality of subsystems based on the determined configuration. This may provide the advantage that the availability of the plurality of subsystems may be guaranteed and any interruption of the system may be avoided. This may further provide the advantage that supplementary systems, e.g. one or more cooling systems, may also be reconfigured in order to efficiently reduce the total power consumption of the telecommunication system.

According to a further embodiment of the invention, the system commands may comprise at least one of the following system commands: switching on a subsystem, switching off a subsystem, suspending a subsystem in standby mode, resuming a subsystem from a standby mode, changing a distribution of processing load, and changing a routing of traffic so that a network traffic load is distributed differently. This may provide the advantage that different types of subsystems may be configured in a more flexible manner. Further, different deployment configurations of the plurality of subsystems may be considered so that a reduction of the power consumption may be achieved more efficiently and more flexible.

According to a further embodiment of the invention, the method may further comprise, if the determined configuration does not meet the predefined stability criterion, discarding the determined configuration, and waiting for the next trigger signal to start collecting the system data. This may provide the advantage that unstable system configurations, i.e. system configuration which may lead to an interruption at the user side, might not be enforced.

According to a further embodiment of the invention, the configuration may be determined so that the total power consumption for at least the part of the plurality of subsystems may be reduced to a minimum total power consumption. This may provide the advantage that the determined configuration may provide an optimum regarding the total power consumption for at least the part of the plurality of subsystems. In other words, costs associated with the power consumption of the telecommunication system may be reduced to a minimum.

According to a further embodiment of the invention, at least the part, in particular all, of the plurality of subsystems may be fully operational during determining the configuration. This may provide the advantage that the operation of the plurality of subsystems is not influenced when determining a configuration for reducing the total power consumption.

According to a further embodiment of the invention, the method may further comprise predicting future parameters of the system data based on historical data in a predefined time interval. This may provide the advantage that it is efficiently predicted whether the system may be in a steady state in the pre-defined interval. For example, the future parameters may indicate the expected traffic load for a subsystem within a time interval of minutes, e.g. 2, 5, 10, 20, or 30 minutes, or a few hours, e.g. 1, 2, or 3 hours.

According to a further embodiment of the invention, the method may further comprise evaluating whether the telecommunication system is in a stable state previous to determining the configuration, wherein evaluating comprises determining whether a continuous change is predicted in the future parameters of the system data. This may provide the advantage that resources for determining a configuration to reduce the total power consumption may be saved if it is predicted that the system might not be in a steady state as indicated by the future parameters. In other words, a more efficient computation of the method may be achieved.

According to a further embodiment of the invention, determining the configuration for at least the part of the plurality of subsystems may only be initiated if the telecommunication system has been evaluated to be in the stable state. For example, the telecommunication system may be evaluated to be in a stable state when the predicted future parameters might not indicate an overload situation and/or might not indicate a significant change of at least one of the predicted future parameters which may lead to an overload situation. The method may further comprise, if the telecommunication system is evaluated not to be in the stable state, terminating the method, and waiting to receive the next trigger signal. This may provide the advantage that the probability of finding a suitable solution is increased for systems which are evaluated to be in a stable or steady state as indicted by the future parameters. This may further provide the advantage that the method may be processed more efficiently.

According to a further aspect of the invention, there is provided a telecommunication apparatus. The telecommunication apparatus comprises a plurality of subsystems and a power reduction module, e.g. a power optimization module, configured to reduce power consumption of a plurality of subsystems. In particular, the power reduction module comprises a system data collector configured to collect system data from at least a part of the plurality of subsystems, a constraint determining unit, e.g. a total system power optimization problem formulator, configured to determine a set of system constraints corresponding to the collected system data for at least the part of the plurality of subsystems, a configuration determining unit, e.g. a total system power optimization problem solver, configured to determine a configuration for at least the part of the plurality of subsystems based on the collected system data so that a total power consumption for at least the part of the plurality of subsystems is reduced and the determined set of system constraints is met, and a system configuration enforcer configured to apply the determined configuration to at least the part of the plurality of subsystems to enforce the determined configuration. This may provide the advantage that the total power consumption of the telecommunication system may be reduced without influencing the stability of the system. Since at least the part of the plurality of subsystems is taken into account for reducing the total power consumption, the total power consumption may be reduced in a more flexible and efficient manner so that a local or a global optimum regarding power consumption may be achieved.

According to an embodiment of the invention, the telecommunication system may be an advanced telecommunications computing architecture (ATCA) system, and the plurality of subsystems may comprise a plurality of advanced telecommunications computing architecture subsystems. This may provide the advantage that the total power consumption of one or more ATCA systems may be reduced.

According to a further embodiment of the invention, the power optimization module may be configured to perform the method as described above.

According to a further aspect of the invention there is provided computer program for reducing power consumption in a telecommunication system, the computer program, when being executed by a data processor, is adapted for controlling and/or for carrying out the method as described above.

As used herein, reference to a computer program is intended to be equivalent to a reference to a program element and/or to a computer readable medium containing instructions for controlling a computer system to coordinate the performance of the above described method.

The computer program may be implemented as computer readable instruction code in any suitable programming language, such as, for example, JAVA, C++, and may be stored on a computer-readable medium (removable disk, volatile or non-volatile memory, embedded memory/processor, etc.). The instruction code is operable to program a computer or any other programmable device to carry out the intended functions. The computer program may be available from a network, such as the World Wide Web, from which it may be downloaded.

The invention may be realized by means of a computer program respectively software. However, the invention may also be realized by means of one or more specific electronic circuits respectively hardware. Furthermore, the invention may also be realized in a hybrid form, i.e. in a combination of software modules and hardware modules.

It has to be noted that embodiments of the invention have been described with reference to different subject matters. In particular, some embodiments have been described with reference to method type claims whereas other embodiments have been described with reference to apparatus type claims. However, a person skilled in the art will gather from the above and the following description that, unless other notified, in addition to any combination of features belonging to one type of subject matter also any combination between features relating to different subject matters, in particular between features of the method type claims and features of the apparatus type claims is considered as to be disclosed with this document.

The aspects defined above and further aspects of the present invention are apparent from the examples of embodiment to be described hereinafter and are explained with reference to the examples of embodiment. The invention will be described in more detail hereinafter with reference to examples of embodiment but to which the invention is not limited.

BRIEF DESCRIPTION OF THE DRAWING

FIG. 10 shows an exemplary time line of power optimization processes of an ATCA system

DETAILED DESCRIPTION

Figure 1:
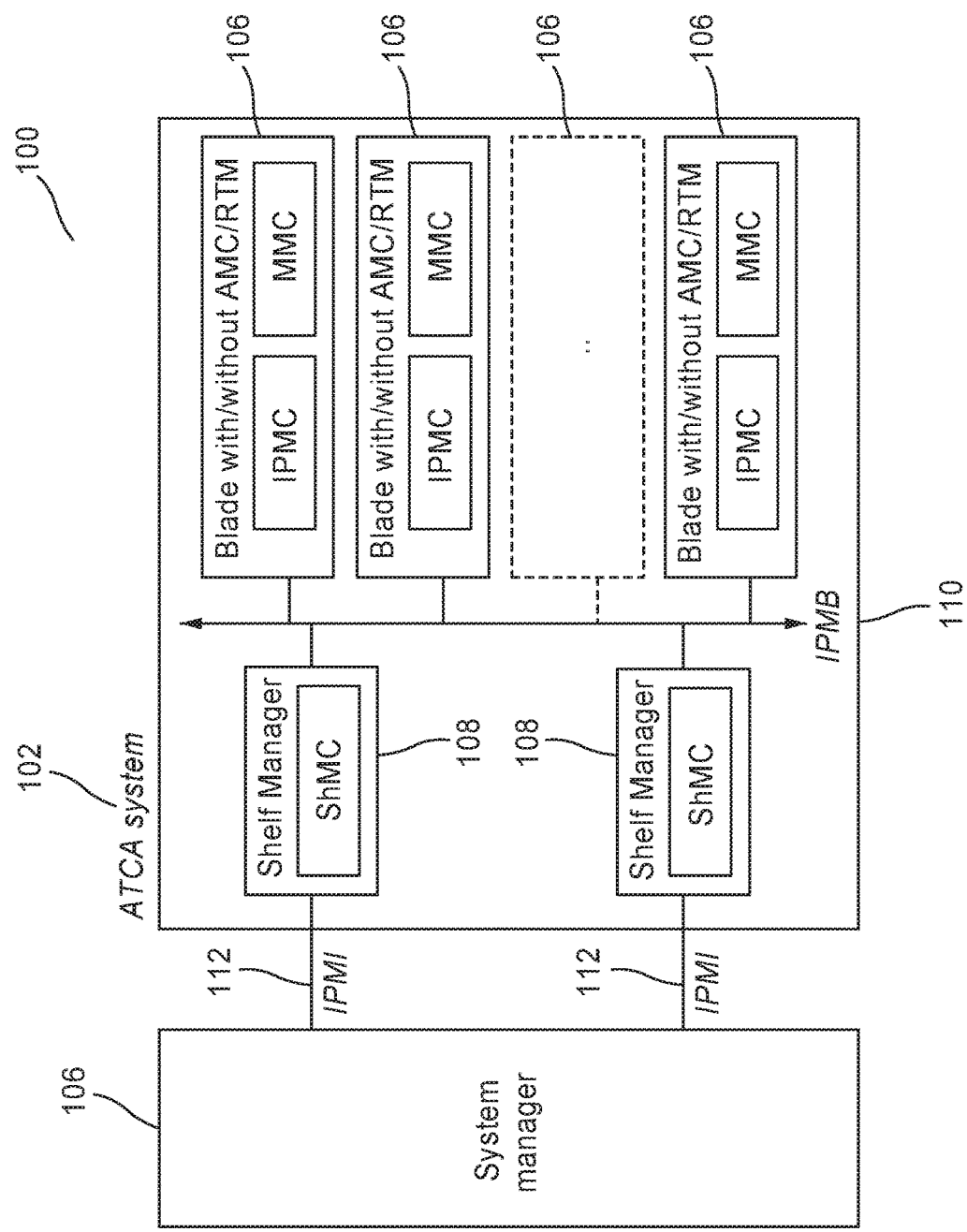
FIG. 1 shows a simplified system overview comprising an Advanced Telecommunications Computing Architecture (ATCA) system.

The illustration in the drawing is schematically. It is noted that in different figures, similar or identical elements are provided with the same reference signs or with reference signs, which are different from the corresponding reference signs only within the first digit.

In the following, an Advanced Telecommunications Computing Architecture (ATCA) system is used to explain the examples of embodiment. However, other systems such as Self-Organizing Networks (SONs) may be used to implement aspects of the present invention. For example, the present invention may also be implemented in a manager module of a self-organizing network.

FIG. 1 shows a simplified system overview of a telecommunication system 100 comprising an Advanced Telecommunications Computing Architecture (ATCA) system 102, monitored and managed by a "System Manager" system 104. The ATCA is a set of industry standard specifications, produced by the PCI Industrial Computers Manufacturers Group (PICMG). The ATCA specification specifies the next generations of carrier grade communications, military and aerospace equipment. ATCA specifications, e.g. PICMG 3.0 Advanced Telecommunications Computing Architecture Base Specification, R3.0, may provide the description of mechanical and electrical design of ATCA systems 102 as well as the basic embedded software and hardware building blocks and their interconnections, designed to achieve sufficient reliability, availability and serviceability depending on the application.

Examples of common wireless network elements running on the ATCA platform or the ATCA system 102 may include Radio Network Controllers (RNC), Base Station Controllers (BSC), Mobile Station Controllers (MSC), Tunneling Termination Gateways (TTG), Serving GPRS support nodes (SGSN), Gateway GPRS support nodes (GGSN), Gateway Mobile Switching Centers (GMSC) and System Architecture Evolution (SAE) or Long-Term Evolution (LTE) components such as Serving Gateways (SGW), Packet Data Network Gateways (PGW), Mobility Management Entities (MME), Evolved Packet Data Gateways (ePDG) etc. The invention may also apply to any other rack/shelf-based computing systems consisting of blades inserted in slots of the shelf/rack.

As exemplary depicted in FIG. 1, ATCA systems 102 may comprise interconnected blades 106, the ATCA subsystems, which may act as processing units and/or networking switches. ATCA systems may also include other subsystems such as power supplies and/or shelf managers 108. The shelf managers 108 may monitor the health of other boards using Intelligent Platform Management Interface (IPMI) protocols, may manage system fans and/or may set a power state of any blade (on/off/standby etc.). The interconnection between shelf managers and the other boards in an ATCA system may be based on multiple Intelligent Platform Management Buses (IPMBs) 110. Shelf managers 108 may also communicate with other external systems, e.g. a system manager 104, via a plurality of networking interfaces using e.g. Intelligent Platform Management Interface (IPMI) 112 specifications or Internet Engineering Task Force (IETF) specifications and corresponding protocols, e.g. Remote Management Control Protocol (RMCP), Simple Network Management Protocol (SNMP) and/or various other protocols.

As can be seen in the example of FIG. 1, there may be various types of ATCA subsystems. For example, ATCA blades 106 may include Advanced Mezzanine Card (AMC) modules which may implement expansion functionality and may be plugged into the system as Rear Transition Modules (RTMs).

Furthermore, at least one or each ATCA subsystem may further include an Intelligent Platform Management Controller (IPMC) and Modular Management Controller (MMC) modules that may be used for signaling, configuration and monitoring purposes.

Similarly, shelf managers 108 may include a shelf management controller (ShMC).

The concept of the system manager may encompass both, automated software systems and human operators. The system manager may be used to remotely monitor and control ATCA systems. In addition, the use of the system manager might not be constrained to a single ATCA system. Several ATCA systems might also be interconnected, wherein the system manager may be able to connect to all of the shelf managers of the one or more ATCA systems.

System availability may be important in ATCA systems. Redundancy principles may be utilized in order to minimize system outages, e.g. application faults and/or network outages, and to achieve predefined customer Service Level Agreements (SLAs). In addition, in order to achieve high degrees of flexibility and serviceability, ATCA subsystems may be field as Field Replaceable Units (FRUs).

ATCA systems may comprise a chassis with free slots for blades that operate with a various number of multicore Central Processing Units (CPUs). Each CPU may be considered as an independent network node. However, common deployments may let behave the whole system as a single network node employing load balancing algorithms for scheduling traffic within the system. In ATCA systems, two major modes of deployment are preferably used. First, a so-called deployment mode N+, where some or all blades, i.e. subsystems, installed on the chassis may act as traffic processing systems. Second, a so-called deployment mode 2N, where blades may be grouped as a pair of active and backup subsystems for preserving zero-outage with a high probability.

In order to achieve predefined levels of operational performance, ATCA subsystems may be grouped in groups of two and more subsystems to implement redundancy principles of the deployment modes as described previously. In particular, the 2N redundancy principle may comprise N active ATCA subsystems which may serve computational load, e.g. networking traffic, and a second set of N ATCA subsystems which may be inactive. In some implementations, each active subsystem may be paired with one inactive or backup subsystem. If one or more active subsystems fail, then the corresponding paired subsystem may take over and may continue to serve computational load, e.g. networking traffic, with zero operational downtime or outage.

The N+M redundancy principle may consist of N active ATCA subsystems and M inactive subsystems. If one or more active subsystems fail, then one inactive subsystem may be activated and may take over the serving of computational load, e.g. networking traffic, from the faulty subsystem.

Moreover, ATCA subsystems may be grouped in load balancing configurations where a plurality of subsystems may share the computational load, e.g. serve equal amounts of networking traffic. Load balancing configurations may be useful in telecommunication systems since load balancing configurations may split the network traffic load among multiple systems, thus maintaining uniformly distributed capacity requirements for the network links and/or avoiding potential network congestions. In addition, load balancing configurations may assure that a single point of failure would not affect a large amount of traffic volume.

The principles as described above with respect to ATCA systems may be applied as well as to any other rack/shelf-based computing systems including blades inserted in slots of the shelf/rack.

A common ATCA system may be configured in e.g. 2N and N+ ATCA deployments to handle the packet core traffic of an operator. Further, such common ATCA system may be configured in a 2N deployment to have all of its subsystems active 24 hours/7 days/365 days in order to satisfy a target availability, e.g. 99.9999% uptime, according to the operator's requirements. ATCA based systems and subsystems use state-of-the-art computing hardware and perform intensive computations for e.g. traffic analysis, routing functions, traffic monitoring & interception. Therefore, conventional ATCA based systems and subsystems may consume high amounts of power. Additionally, ATCA systems may also require high amounts of cooling power according to air conditioning requirements which is needed to keep the system temperature within specifications.

Thus, by having all ATCA subsystems active even in times when they do not handle any load, the system may be rendered highly non-optimal in its usage of energy resources. Further, energy may wasted by not taking into account that the power consumption of ATCA subsystems is a function of load (e.g. traffic). Thus, common ATCA systems might not distribute the load in the optimal way across subsystems.

In particular, the processing load handled by the ATCA system may be a function of a plurality of parameters such as the mobile user behavior (session creation, network traffic generation, idle states and session deletion events and statistics depending on the time of the day and the day of the year), the network state and parameters (e.g. routing policies, potential downtime of related systems) and operator configuration (whether e.g. deep packet inspection, content caching, video optimization is configured).

Depending on the ATCA deployment mode (such as 2N or N+ described above), the ATCA system may schedule the workload among the active ATCA subsystems. For example, when N+ deployment is used, traffic may be distributed among and handled by all the active subsystems, thus achieving a specific level of performance and power consumption.

This invention may provide a power optimization module for ATCA systems. The power optimization module may solve an optimization problem using a suitable technique or algorithm such as exhaustive search or an interior point method. The choice of technique or algorithm may be flexibly chosen by the implementation and depends on e.g. the ATCA system dimension. For modern ATCA systems that comprise a small number of ATCA subsystems, an exhaustive search might not require considerable computational complexity—and may provide the optimal (or suboptimal in favor of complexity) solution to the allocation of resources among the ATCA subsystems.

Figure 2:
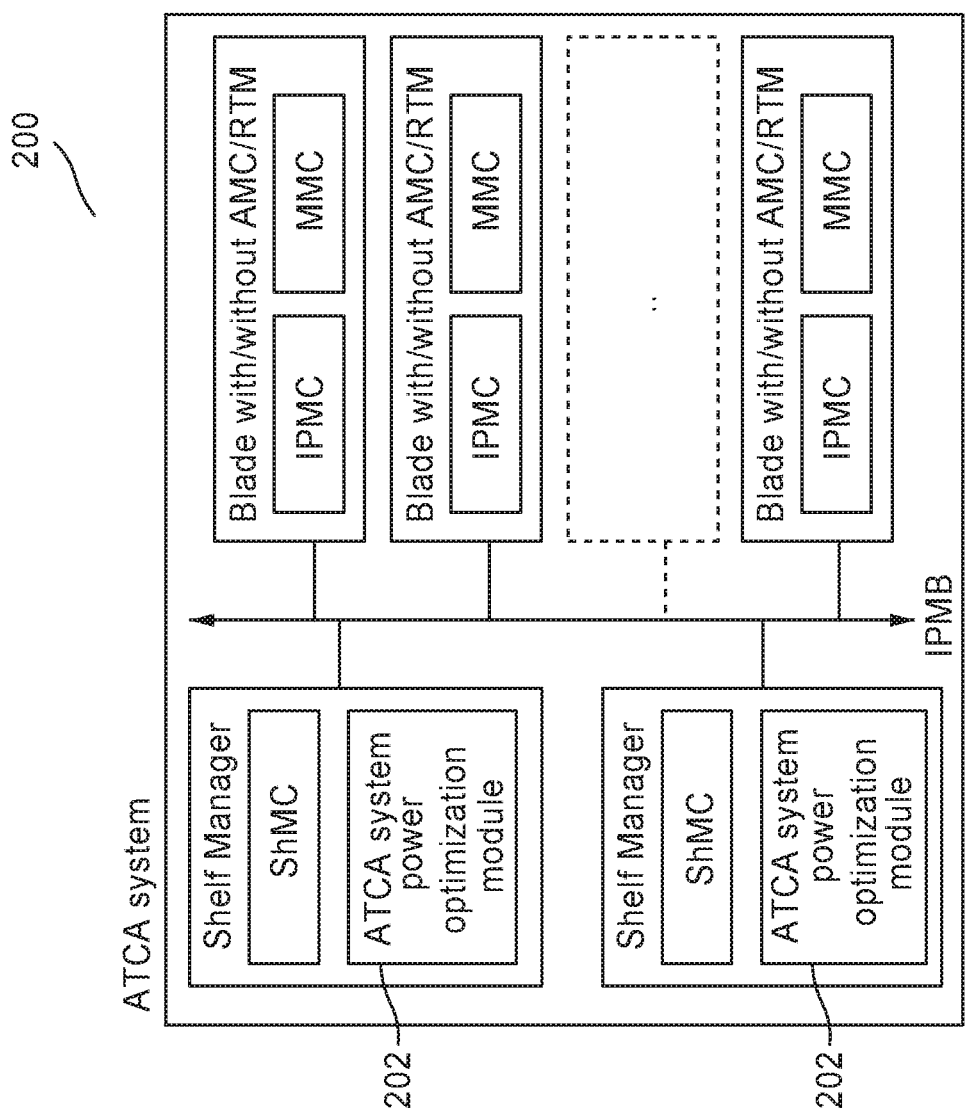
FIG. 2 shows an exemplary ATCA system including a power optimization module within shelf managers
Figure 3:
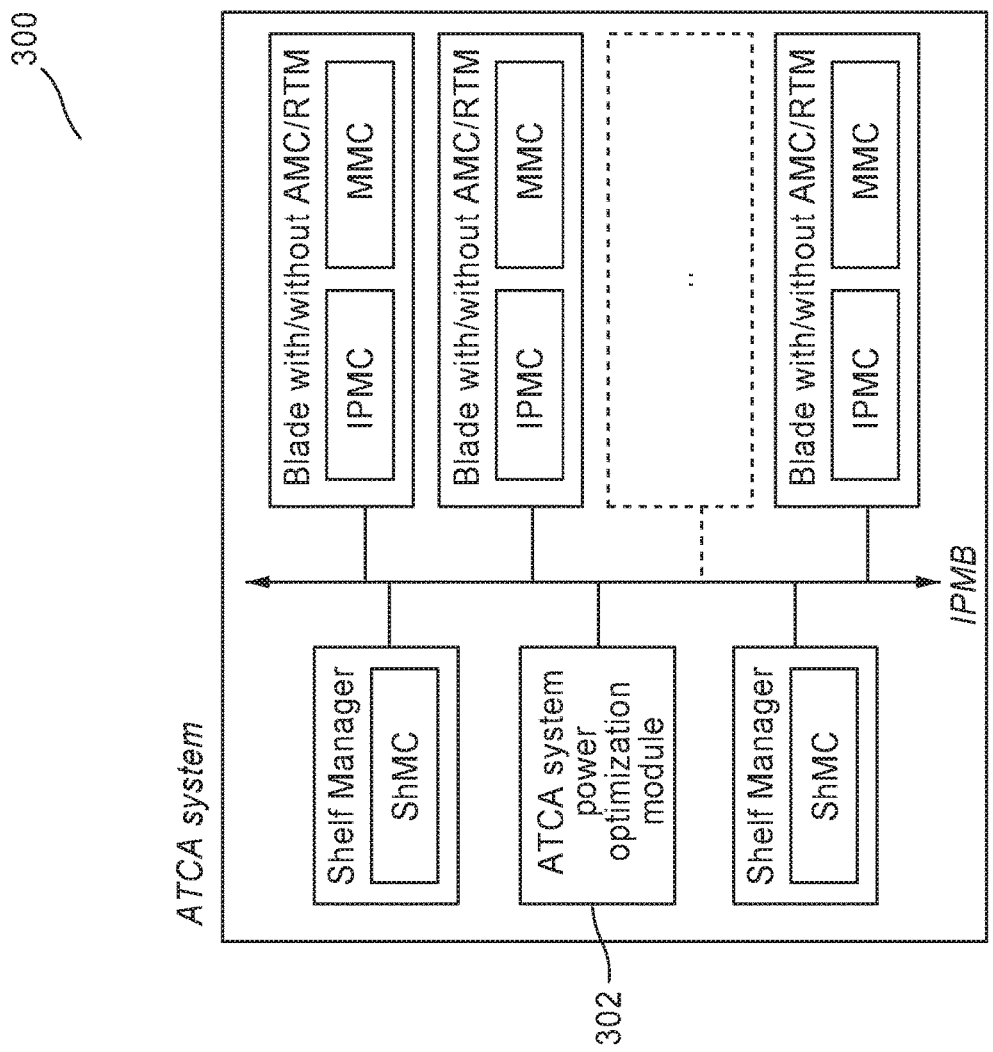
FIG. 3 shows an exemplary ATCA system including a power optimization module as an internal module of the ATCA system
Figure 4:
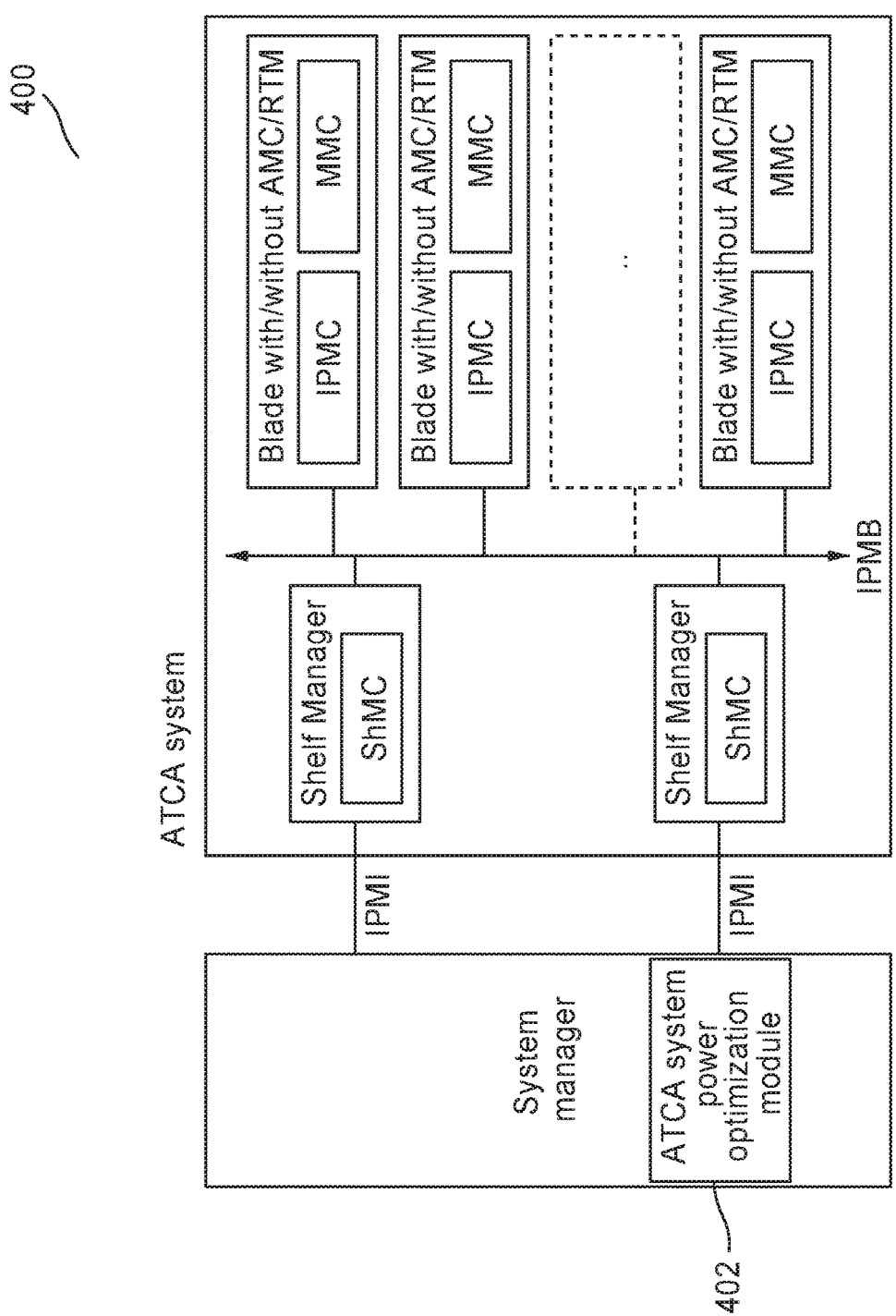
FIG. 4 shows an exemplary ATCA system and a power optimization module as an external module of the ATCA system

As shown in FIGS. 2 to 4, one or more power optimization modules may be included in one or more ATCA system in order to perform power optimization of the one or more ATCA systems. A power optimization module may measure a system state regarding load and power consumption, may take into account future estimates and predefined profiles for system states, may formulate the optimization problem of minimizing total ATCA power consumption, may solve the optimization problem and may allocate available resources optimally among the ATCA subsystems.

FIG. 2 shows an exemplary ATCA system 200 including a power optimization module 202 within one or more ATCA shelf managers 208. The power optimization module may be a software component included with the one or more ATCA self managers 208. The power optimization module 202 may also be included as a software component in any other ATCA subsystem.

FIG. 3 shows an exemplary ATCA system 300 including a power optimization module 302 as an internal module of the ATCA system 300. The power optimization module 302 may be implemented as a hardware module, e.g. an ATCA subsystem, within the ATCA system 300.

FIG. 4 shows an exemplary ATCA system 400 and a power optimization module 402 as an external module of the ATCA system 400. The power optimization module 402 may be implemented as a software module, a hardware module, or a combination of both, software and hardware modules, which may be located outside of the ATCA system 400. Preferably, the power optimization module is integrated within a System Manager entity 404.

It should be noted that in the above figures the types of interfaces, blade types and component architecture are merely examples rather than limitations and that the power optimization module may be integrated in any ATCA or similar system.

Figure 5:
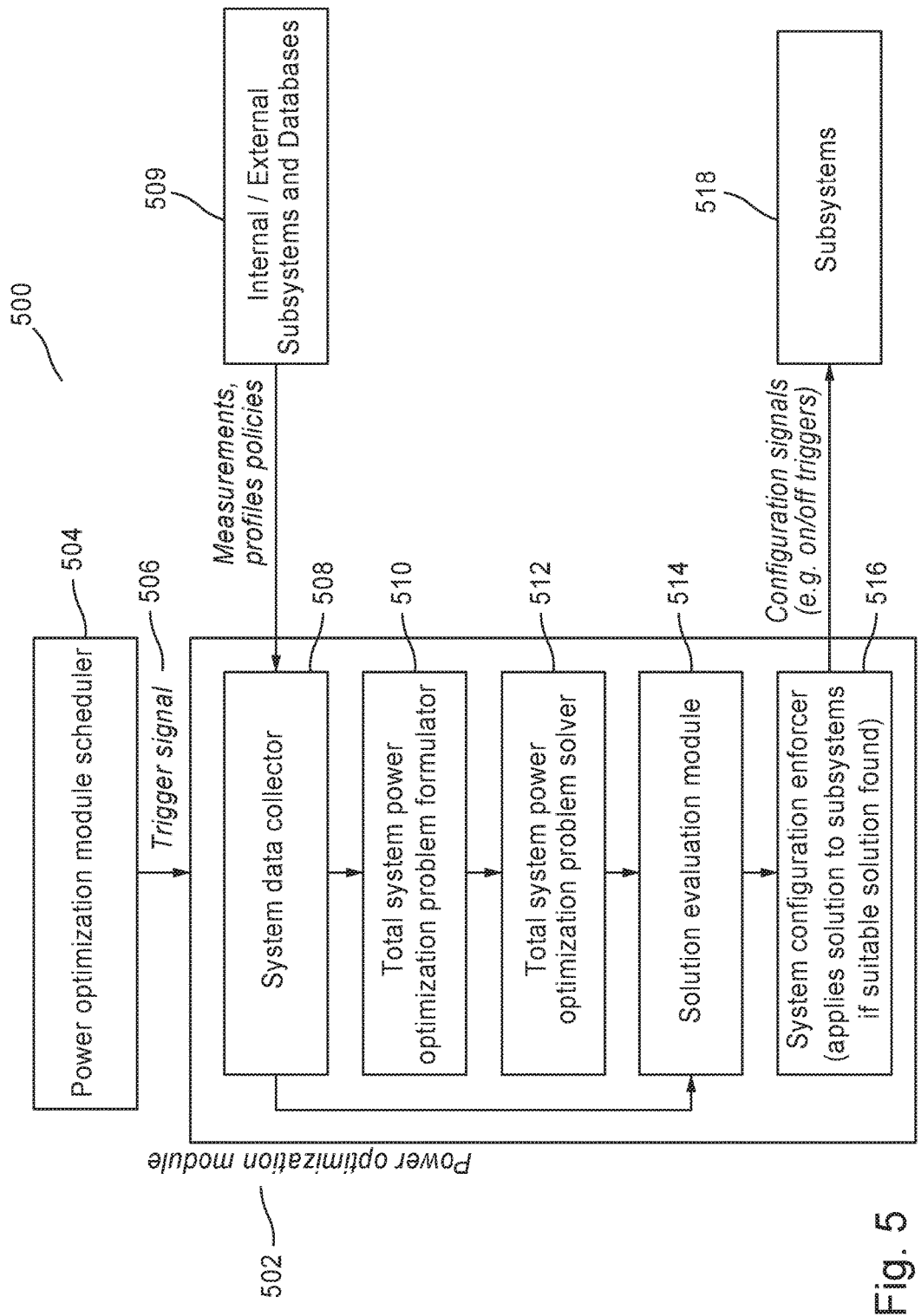
FIG. 5 shows an exemplary block diagram of a power optimization module

FIG. 5 shows an exemplary block diagram 500 comprising a power optimization module 502. The power optimization module 502 may be triggered by any other module or scheduler, e.g. a power optimization module scheduler 504. For example, the power optimization module scheduler 504 may periodically trigger, e.g. one or two times per minute, the power optimization module 502 by providing a trigger signal 506 to the power optimization module 504. Additionally or alternatively, the power optimization module scheduler 504 may trigger the power optimization module 502 based on events, e.g. traffic bursts, failure of subsystems, etc.

Further, the power optimization module 502 may comprise one or more of the following submodules:

A system data collector 508 which may collect all available information on the system, i.e. the ATCA system, such as power and processing load measurements, historical data, statistics and power/traffic/load profiles, operator policies etc. from any entity, e.g. internal or external systems/subsystems and databases 509.

A total system power optimization problem formulator 510, e.g. a constraint determining unit, which may formulate the optimization problem of minimizing total system power consumption. The total system power optimization problem formulator 510 may take as an input all collected measurements and may formulate the problem variables, the objective function and the constraints of the optimization problem.

A total system power optimization problem solver 512, e.g. a configuration determining unit, which solves, using any suitable algorithm or procedure, the optimization problem formulated by the total system power optimization problem formulator 510.

A solution evaluation module 514, e.g. a stability evaluation unit, which may evaluate the suitability of the solution produced by the optimization problem solver 512, taking into account all the information gathered by the system data collector 508. The solution evaluation module may decide whether the solution of the optimization problem solver 512 may be suitable for application to the system with respect to network stability. The solution evaluation module 514 may have the advantage that unstable extreme situations of continuously enabling/disabling subsystems 518 may be avoided.

A system configuration enforcer 516 may apply the selected solution (if any) from the solution evaluation module 514 to all subsystems 518. The system configuration enforcer 516 may send disable commands to the subsystems 518.

Furthermore, the power optimization module 502 may use the following parameter for reducing, e.g. optimizing, the power consumption of the subsystems:

- measured network traffic load from each ATCA subsystem 518, including signaling and user data traffic loads,
- estimations and projections of network traffic load based on profiles of mobile user behavior and knowledge of the network states: For example, the estimations may comprise that the traffic load is decreasing during night. The estimations and projections of network traffic load may be used to evaluate whether a determined solution or configuration of the total system power optimization problem solver 512 may affect network stability.
- measured processor load of pat least a part or all of the processing units in each ATCA subsystem,
- processing load-power consumption characteristics for at least one or each subsystem in the ATCA system: The characteristics may be actual measurements or projected profiles, e.g. estimations;
- an ATCA system configuration including specific deployment types and/or modes of operations of at least one or each ATCA subsystem,
- specific performance targets such as desired availability, target quality of service per traffic profile, system capacity and/or network throughput etc.
- any constraints such as limitations on the total power consumption and/or limitations on the maximum allowed processing load per ATCA subsystem
- any operational and/or technical specification differences between the various ATCA subsystems
- any technical constraints regarding the type of network traffic, e.g. signaling or data and application type such as traffic analysis, specific routing functionality, traffic monitoring, content caching etc., and how such traffic may be handled and transferred from one ATCA subsystem to another, e.g. limitations and/or delays etc., in case of e.g. switchovers. This parameter may help to program actions for preserving system stability and may minimize any user-experience outage.

Figure 6:
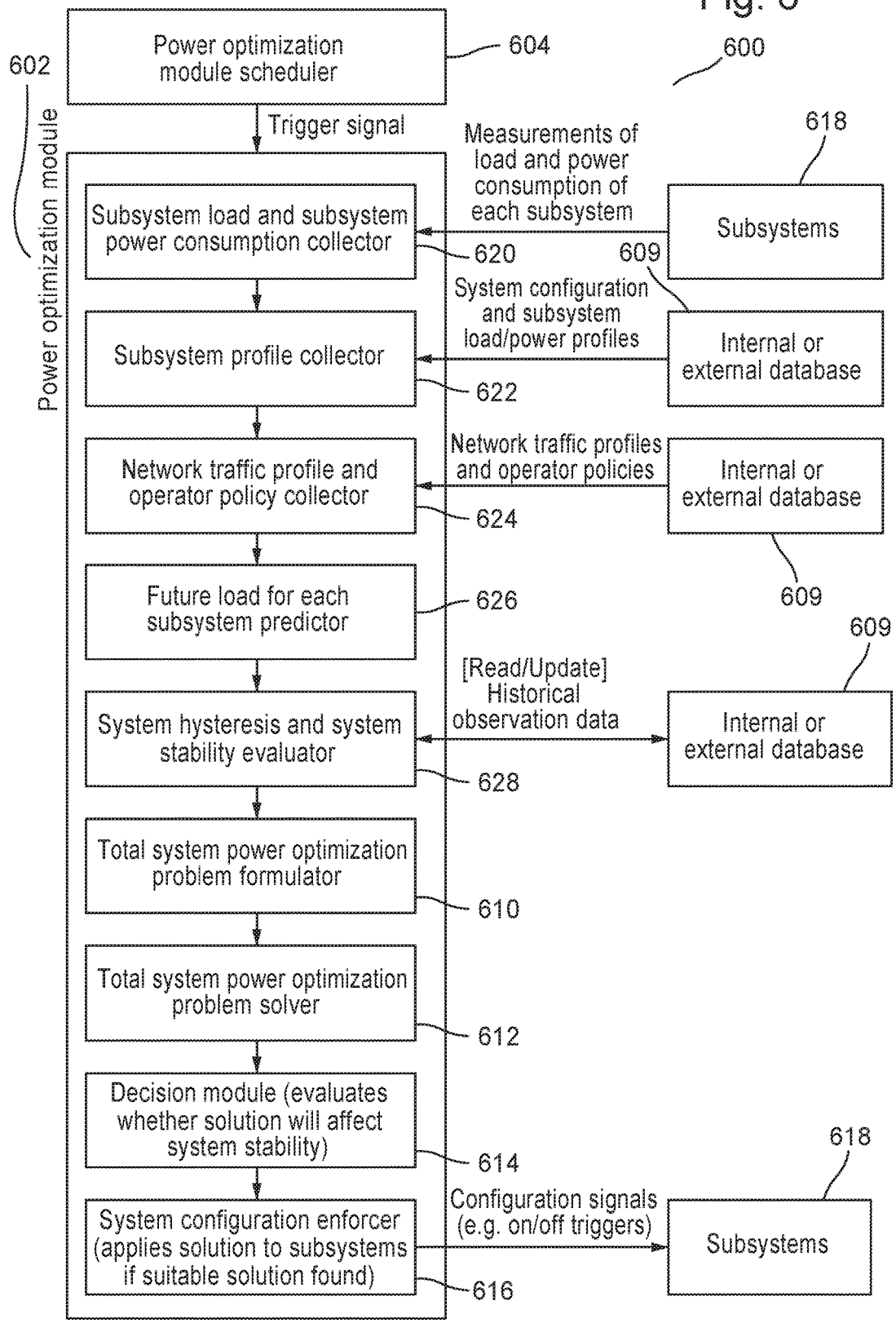
FIG. 6 shows an exemplary block diagram of an extended power optimization module

FIG. 6 shows an exemplary block diagram 600 comprising an extended power optimization module 602. The extended power optimization module 602 may include one or more submodules or units which may operate in a sequential or in a parallel order:

- A subsystem load and subsystem power consumption collector submodule 620 which may collect measurements of load, e.g. traffic load, signaling load, and/or CPU load, and/or power consumption from at least a part or all of the subsystems.
- A subsystem profile collector submodule 622 which may collect profiles for at least a part or all of the subsystems, such as load/power profiles in e.g. look-up table, curve or other form, from internal or external databases 609. The profiles may be pre-defined according to a specification of a subsystem.
- A network traffic profile and operator policy collector submodule 624 which may collect traffic profiles, e.g. statistics for each time of the year, and/or operator policies, including functionality, configuration changes and/or traffic shaping, which might affect the load and power consumption of the system and subsystems, from internal and/or external databases 609. Network traffic profiles and/or operator policies may be defined and provided by an operator of the ATCA system.
- A predictor submodule 626 which may predict or estimate a future load for each subsystem in any detail required by the following modules.
- A system hysteresis/delay and system stability evaluator submodule 628 which may evaluate the current and future stability of the system in terms of overload conditions, e.g. overload thresholds. The system hysteresis/delay and system stability evaluator submodule 628 may use historical data and/or observation data taken from any internal and/or external database 609 and may also update this database if needed.
- A total system power optimization problem formulator submodule 610 which may formulate the optimization problem of minimizing total system power consumption.
- A total system power optimization problem solver submodule 612, which may solve, using any suitable algorithm or procedure, the optimization problem formulated by the total system power optimization problem formulator submodule 610.
- A solution evaluation module 614 which may evaluate the suitability of the solution produced by the optimization problem solver 612, taking into account at least some or all the information gathered by the system data collector 620 and may decide whether this solution may suitable for application to the system with respect to e.g. network stability. By evaluation the solution according to e.g. network stability, unstable extreme situation of enabling/disabling subsystems continuously may be avoided.
- A system configuration enforcer 616 which may apply the selected solution (if any) from the previous module to at least a part or all of the subsystems. For example, the system configuration enforcer 616 may send system commands, e.g. a command for disabling a subsystem to a particular subsystem.

Figure 7:
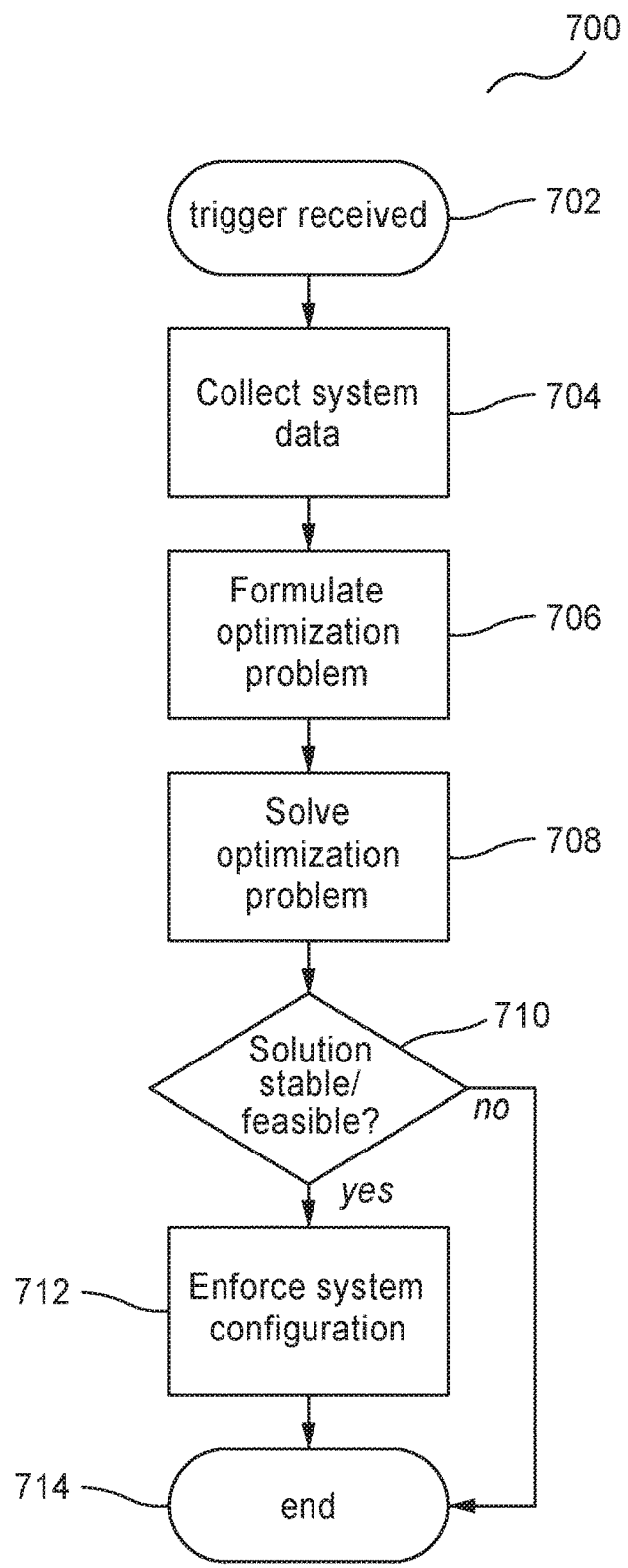
FIG. 7 shows an exemplary flow chart of a power optimization module

FIG. 7 shows an exemplary flow chart 700 of the power optimization module 502. Once the power optimization module 502 is started, e.g. triggered 702, by any other entity or component, the power optimization module may start collecting system data (step 704). In the following steps, the optimization problem may be formulated 706 and solved 708.

The solution may then be evaluated 710 for its stability and feasibility. If the solution might not be deemed as suitable or stable, the whole process/method may conclude 714 without applying the solution since the solution might affect system stability and/or network stability. Otherwise, if the solution may be deemed suitable, the solution may be enforced/applied 712 to the system and at least a part or all of its subsystems and a transition phase for the system state begins during which the system may remain fully operational. After enforcing the solution, the method may terminate/end 714.

Figure 8:
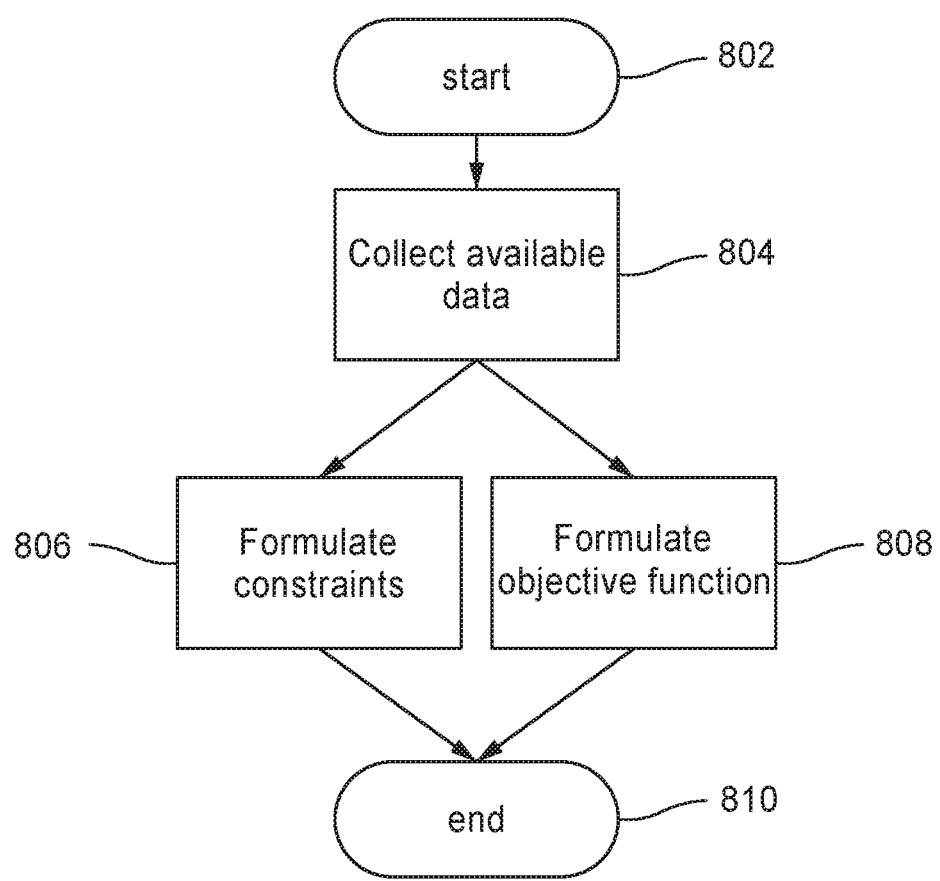
FIG. 8 shows an exemplary flow chart of an optimization problem formulator module

FIG. 8 shows an exemplary flow chart 800 of an optimization problem formulator module 510. After starting 802 the optimization problem formulator module 510, at least some or all available data may be collected 804. Upon collecting 804 some or all available data, the optimization problem constraints may be defined 806 and evaluated. In addition, the objective function of the optimization problem may be formulated 808. Thus, all the pre-processing steps necessary as input to the optimization problem solver 512 may be completed so that the method of the optimization problem formulator module 510 may terminate/end in step 810.

Figure 9:
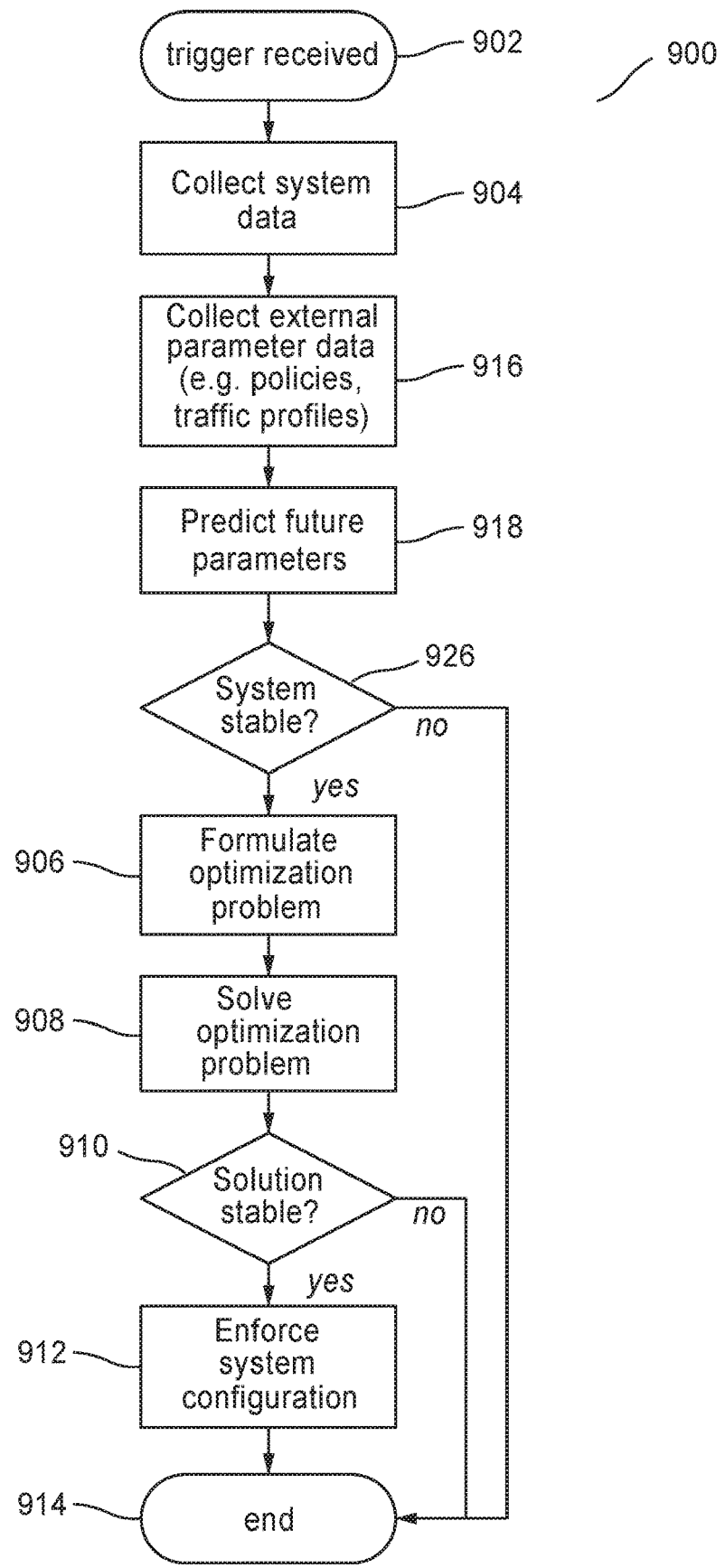
FIG. 9 shows an exemplary flow chart of an extended power optimization module

FIG. 9 shows an exemplary flow chart 900 of an extended power optimization module. Once the power optimization module is started, e.g. triggered 902 by any other entity and/or component, the power optimization module may start collecting 904 system data. In addition, other parameters and/or data, e.g. external parameters, may be gathered/collected 916 such as operator policies, traffic profiles, etc. In the next step, a future state of the system and a future value of system parameters may be predicted 914. Then, the procedure may ascertain 920 that the system is currently stable. The term "stable" may be specified as meeting a predefined stability criterion. For example, the predefined stability criterion may refer to a time interval in which a particular value of a time trend may show a steady state. If the system is predicted to be not stable, the procedure may be terminated. If the system is stable, the optimization problem may be formulated 906 and then solved 908. The solution may then be evaluated 910 for its stability and feasibility. If the solution is not deemed as suitable/stable, the whole process concludes 914 without applying the solution since the solution may affect system stability. Otherwise, if the solution is deemed suitable, the solution may be enforced/applied 912 to the system. For example, ATCA subsystems may be signaled by the shelf manager to go into a standby state or wake up from a standby state. Further, at least a part or all of the subsystems may be in a transition phase when a change of the system state begins during which the system may remain fully operational.

Optimization Problem Formulation

In the following, an exemplary formulation of an optimization problem is described which may consider some or all of the following parameters:

- The measured network traffic load from at least one or each ATCA subsystem (including signaling and user data traffic loads).
- Estimations and/or projections of network traffic load based on profiles of mobile user behavior and knowledge of the network states.
- The measured processor load of at least one or all of the processing units in at least one or each ATCA subsystem.
- The processing load-power consumption characteristics for each subsystem in the ATCA system. The characteristics may be actual measurements and/or projected/estimated profiles.
- The ATCA system configuration including specific deployment types and/or modes of operations of at least one or each ATCA subsystem.
- Specific performance targets such as desired availability, target quality of service (QoS) per traffic profile, system capacity and/or network throughput.
- Any constraints such as limitations on the total power consumption and/or limitations on the maximum allowed processing load per ATCA subsystem.
- Any operational and/or technical specification differences between the various ATCA subsystems.
- Any technical constraints regarding the type of network traffic, e.g. signaling or data and application type such as traffic analysis, specific routing functionality, traffic monitoring, content caching etc., and how such traffic can be handled and transferred from one ATCA subsystem to another, limitations, delays etc., in case of e.g. switchovers.

For formulating the optimization problem, it is assumed that the system, in particular the telecommunication system, may comprise N subsystems. The power optimization module may aim to minimize the total system power consumption by formulating an objective function under specific constraints. The objective function as defined below may represent an exemplary objective function out of a plurality of objective functions comprising variables regarding power, load, and/or scheduling constraints. The variables of the objective function may be adapted to specific system constraints, e.g. available and/or measured system constraints of at least a part of the N subsystems.

The objective function may be formulated as follows:

$$\min_{\underline{c},\underline{x}} \; P_{tot}(\underline{x}) = \varepsilon \sum_{i=1}^{N} P_{st}^{(i)} c_i + (1-\varepsilon) \sum_{i=1}^{N} P_{xs}^{(i)}(x_i)$$

subject to the following constraints:

$$i \in \{1, \dots, N\}$$
$$x_i \in [0, 100]: \% \text{ CPU load of subsystem } i$$
$$\underline{x} = [x_i \; \dots \; x_N]^T$$
$$c_i \in \{0, 1\}$$
$$\sum_{i=1}^{N} c_i \geq 1$$
$$\underline{c} = [c_1 \; \dots \; c_N]^T$$

$\varepsilon \in (0,1)$: is used to prioritize the first term over the other and vice versa $$\underline{P}_{xs}^{(i)} \in [0, P_{max}^{(i)} - P_{st}^{(i)}], \forall i \in \{1, \dots N\}$$

$$x_i \leq \tau_i, \tau_i \in (0,1], \forall i$$

$\tau_i$: overload threshold.

According to the above formulation, the total system power may be defined as a weighted sum of two semi-independent terms. This first term may be the constant $P_{st}^{(i)}$, which may represent the standard power consumption of subsystem i when it may be active but might not process any traffic load (idle state). The second term, $P_{xs}^{(i)}(x_i)$, may be the excess power that subsystem i may consume when it processes traffic load. The second term may be a function of load, e.g. a function of CPU load $x_i$, and/or a function of traffic load.

Variable $c_i$ may be a scheduling variable for at least one or each subsystem i. The variable $c_i$ may take binary values, i.e. zero or one, for disabling or enabling a subsystem respectively. When the variable $c_i$ is equal to zero, the variable $c_i$ may eliminate the first term. When a subsystem is chosen to be deactivated, the excess power term, i.e. the second term, may also be eliminated since its' CPU load will be zero. The sum $$\sum_{i=1}^{N} c_i \geq 1$$

may indicate that at least one subsystem should be active in order to avoid the extreme case of powering off all subsystems of the system.

Furthermore, $P_{xs}^{(i)}(x_i)$ cannot be greater than $P_{max}^{(i)} - P_{st}^{(i)}$, where $P_{max}^{(i)}$ may be the maximum power consumption of a subsystem at full load, e.g. full CPU and/or full traffic load. The maximum power consumption may be provided by the subsystem manufacturer.

The constraint $x_i \leq \tau_i$, $\tau_i \in (0,1]$, $\forall i$ may indicate that the allocated load, e.g. the allocated CPU load, to any subsystem i should not exceed a predefined or configurable overload threshold $\tau_i$. The overload threshold may provide the advantage that a subsystem below the overload threshold may be defined as a stable subsystem.

In the optimization problem as described above, the optimization variables, i.e. the variables that may be found to contribute to the optimal solution by solving the optimization problem, may be $\underline{x}=[x_i \ldots x_N]^T$ and $\underline{c}=[c_1 \ldots c_N]^T$. More specifically, the solution may choose to enable or disable each subsystem and may distribute the traffic load accordingly. In this respect, it is noted that $\underline{x}=[x_i \ldots x_N]^T$, i.e. the CPU load, may be exemplary defined as a result of traffic load processing. The second variable, i.e. $\underline{c}=[c_1 \ldots c_N]^T$, may be considered as auto-adjustive. When the ATCA system operates in a load balancing mode, the traffic load may be distributed among at least a part or all of the active subsystems equally by the network. An equally distributed traffic load may also result in an equally distributed CPU load among at least a part or all of the subsystems. In other words, the optimization problem may provide a solution regarding how to distribute the load.

The above optimization problem may be a combinatorial optimization problem and may be solved using any available algorithm/solver. Examples of such algorithms may be simplex and interior point algorithms. When at least a part or all of the subsystems are identical, the above optimization problem may be solved with significantly less complexity, i.e. may be solved in polynomial time.

In small scale systems, in particular ATCA systems, which may include less than 50 subsystems, the optimization problem may be solved via enumeration. The power optimization module may solve the optimization problem and may compute the objective function for all of the possible subsystem combinations by tweaking or toggling the respective binary optimization variables $\underline{c}=[c_1 \ldots c_N]^T$. The complexity may grow exponentially with the number of subsystems, but the complexity might not significantly influence the computational time required for solving the objective function in dimensions less than 50 subsystems. Moreover, optimization module might not be triggered very frequently, since the network may need several minutes to come to a steady or stable state. For example, the optimization module may be triggered once or twice a minute or every 1, 2, 3 . . . 10 minutes.

Examples of Formulating and Solving the ATCA Total Power Optimization Problem According to the Power Optimization Module The following examples show how the power optimization module may be applied to telecommunication systems and, in particular, to ATCA systems.

In a first example, an ATCA system may comprise a small number of subsystems where only the ON/Standby state of each ATCA subsystem may be managed. This system may have the lowest complexity in terms of power/load/traffic management.

The first example may consider an ATCA system operating in a mobile data network during low data traffic hours, e.g. at night. The specific network setup, in particular the ATCA configuration, may employ 4 subsystems, e.g. 2 active/serving subsystems and another 2 subsystems in standby mode, accommodating high availability services. Each subsystem may process traffic load up to 10 Gbps, which results in 20 Gbps total system capacity. At a specific time, the measured traffic that is processed in the ATCA system is 3 Gbps. Thus, 15% of total system capacity may be used and the rest of the computing power may be spent unreasonably. The power optimization module may deactivate 1 subsystem of the 2 active subsystems since the capacity of one subsystem may be enough to handle current traffic conditions. The power optimization may perform the following process as depicted in FIG. 5:

1. The system data collector 508 may gather/collect traffic and CPU load from all subsystems, e.g. subsystem 1 processes 1,2 Gbps traffic and its' CPU is 35% loaded etc.
2. The optimization problem formulator module 510 may map the collected measurements to the respective problem variables.
3. The problem solver 512 may solve the optimization problem. The algorithm which may used to solve the optimization problem may be subject to the system specifications of the subsystems of the one or more ATCA systems. For small dimension ATCA systems (up to 50 subsystems), exhaustive search may be used that may always yield the optimal solution in terms of maximum throughput and power consumption minimization. For systems comprising more subsystems, low-complexity algorithms may be used in order to ensure real-time solver response. A branch and bound method may be the best choice, since the branch and bound method may always yield the optimal solution of the system setup, e.g. ON/STANDBY subsystems and/or traffic load distribution among them. The branch and bound method may have reduced computational complexity as compared to an exhaustive search.

In the first example using 4 subsystems, the exhaustive search may be used. The optimization problem solver may examine all possible subsystem combinations to find the best subset in terms of total power consumption minimization. As specified by the optimization problem formulation, a weighted sum of constant standby power consumption along with the consumed processing power as a function of CPU load may be calculated for each possible subsystems subset. The subsystems subset with the smallest calculated value may be selected as the optimal solution and may be enforced via configuration commands to the ATCA system. For example, the solver 512 may select a pair of subsystems in the first example, e.g. 1 active subsystem and 1 subsystem in standby mode, since a single active subsystem may be able to handle the current traffic load and the power consumption or power cost of two active subsystems with low CPU load may be larger as compared to the power consumption or power cost of one active subsystem having increased CPU load.

4. The solution evaluation module 514 may act as a guardian/stabilization step that may prevent the systems to perform sequential configuration changes in traffic conditions of strong traffic load fluctuations without any stable evolution profile. The solution evaluation module may be implemented as a learning filter that may know whether the current network traffic conditions may be unstable in terms of load and may discard the optimization problem solution to prevent the power optimization module from changing system configuration, e.g. to switch ON and/or OFF subsystems.

5. As a last step, the solution enforcer, e.g. the system configuration enforcer 516, may map or transform the optimization problem solution to system configuration commands. For example, the system configuration commands may switch off subsystems which might not be required to handle traffic load. The solution enforcer module may operate as part of the shelf manager that may be located internally or externally of the one or more ATCA systems.

In a second example, the total power consumption of the ATCA system may be minimized by optimally balancing the CPU load and/or traffic load for each one of the ATCA subsystems in real-time as a final product of the solution of the optimization problem described previously. In other words, the optimization algorithm may choose how much traffic to allocate to each ATCA subsystem so that the sum of the power consumed by all subsystems may be reduced to a minimum.

The second example may consider an ATCA system configured with e.g. N=12 subsystems. One half of the subsystems may be configured to process and analyze mobile traffic and the other half of the subsystems may accommodate high availability services. During the day, network traffic load may vary, reaching high values during rush hours stressing the system to its limits, and dropping down to a low load level during e.g. night hours.

FIG. 10 shows an exemplary time line 1000 of power optimization processes of an ATCA system of the second example. In particular, the timeline shows a transition time interval where mobile users may start to log off the network at time t0 1002 and where a traffic load trend may be decreasing. At time t1 1004, a traffic burst may arrive and the ATCA system may operate for a while near its limits until mobile users may start gradually to decrease at time t2 1006 and only a few mobile users may be left online.

The method for reducing power consumption implemented in the power optimization module may perform the exemplary power optimization processes at times t0 to t2 as described below.

Mobile users may begin to log off the network at time t0. At time t0+t, where t may have an arbitrary value in the interval t0<t<t1, a particular amount of users may have already logged off the network. The power optimization module may be triggered and may perform the following process:

1. The system data collector 508 may collect measurements of traffic and/or CPU load from at least a part or all of the subsystems.
2. The optimization problem formulator module 510 may map the collected measurements to the respective problem variables.
3. The problem solver 512 may solve the optimization problem. At time t0, where some or all subsystems may be active but the traffic load may have decreased, the problem solver 512 may examine all possible subsystem combinations and may calculate the power consumption or the power cost subject to the objective function of the optimization problem. The algorithm may provide a solution for which only a subset of all subsystems may be required to handle the current network traffic load. The solution of the problem solver 512 may deactivate some subsystems and their standby pairs. Thus, the remaining active subsystems may operate with increased CPU and/or traffic load which may result in less total power consumption since the power cost of a fully loaded subsystem might not differ significantly from the power cost an idle subsystem. If the subsystems may comprise subsystems of an identical type, i.e. the hardware and/or the software configuration of the subsystems may be identical or almost identical, the traffic may be uniformly distributed among the subsystems of identical type. If the subsystems may comprise subsystem of different types, i.e. the hardware and/or the software configuration of the subsystems differ significantly, the problem solver 512 may provide a solution which may result in equal power consumption for each subsystem. The information regarding the hardware and/or the software configuration of the subsystems may be provided by the subsystem profile collector module 622 to the problem solver 612. For example, if the subsystem hardware is different for at least a part or all of the subsystems, the CPU load of each of the subsystems may vary and the traffic may be distributed to the different subsystems so that the CPU load of at least the part or all of the subsystems may be identical.
4. The solution evaluation module 514 may act as a guardian/stabilization step that may prevent the one or more systems, in particular the one or more ATCA systems, to perform sequential configuration changes in traffic conditions of strong traffic load fluctuations without any stable evolution profile. The solution evaluation module 514 may be implemented as a learning filter that may know whether the current network traffic conditions may be unstable in terms of load, e.g. network and/or traffic load, and may discard the optimization problem solution to prevent the power optimization module from changing the system configuration. When the traffic load trend is decreasing, the solution evaluation module 514 may allow the solution to be enforced in the ATCA system.
5. As a last step, the solution enforcer 516 may map or transform the optimization problem solution to system configuration commands. The system configuration commands may turn off subsystems that are chosen not to handle any traffic. The solution enforcer module 516 may operate at the shelf manager which may be located internally or externally of the one or more ATCA systems.

At time t1, the system, in particular the ATCA system, may operate with a number of subsystems turned off and the remaining subsystems may process the network traffic. If a traffic burst arrives and at least a part of the active subsystems may arrive at an overload state, the power optimization module 502 may be triggered. The power optimization module may perform the following process:

1. The system data collector 508 may gather/collect the traffic and/or CPU load from at least a part or all of the active subsystems.
2. The optimization problem formulator module 510 may map the collected measurements to the respective problem variables of the optimization problem. In this respect, it is noted that the deactivated subsystems may also be taken into account in the objective function calculation. In order to compute the optimal solution, the optimization problem may have to know all parameters of the optimization problem which may include also the parameters of the deactivated subsystems.
3. The problem solver 512 may solve the optimization problem. If the gathered/collected subsystem parameters may violate the optimization problem constraints, e.g. the constraint CPU load<100%, more subsystems may have to be activated in order to process current traffic needs. Again, the deployed algorithm may yield a solution that may specify the exact number of active subsystems and their standby pairs that may be needed to process network traffic without violating optimization problem constraints, e.g. system constraints such as CPU load<100% and P<Pmax per subsystem. The algorithm may examine at least a part or all of possible subsystem combinations and may find the combination that may result to the smallest objective function value, i.e. the result which may use the minimum number of active subsystems and which may choose those subsystems that may consume the lowest power consumption for processing current traffic demands.
4. The solution evaluation module 514 may recognize the increasing trend of network traffic and may allow the solution yielded by the solver to be enforced to the ATCA system in order to accommodate mobile users' needs.
5. The solution enforcer, e.g. the system configuration enforcer 516, may map the yielded solution to system configuration commands. For example, the system configuration commands, when executed, may switch on the excess subsystems needed for handling the current traffic needs.

After the burst of traffic and the system adaptation to network needs at time t1, mobile users may start to log off the network massively at time t2. The CPU load of the operational subsystems may start to drop down again. At time t2+t, where t is the time when the power optimization module 502 is triggered, the power optimization module 502 may perform the following process:
1. The system data collector 508 may gather/collect the traffic and/or CPU load from at least a part or all of the active subsystems.
2. The optimization problem formulator module 510 may map the collected measurements to the respective problem variables.
3. The problem solver 512 may solve the optimization problem. This situation may be identical with the situation at time t0. In particular, more subsystems than needed may be active and may operate at very low CPU load. Current network needs might be handled by less active subsystems that may operate at higher CPU load. As described earlier, subsystems operating at full load may consume only slightly more power than subsystems which are active and idle. The algorithm may examine all possible subsystem combinations and may select the subsystem combination which results in the smallest objective function value, i.e. the smallest total power consumption.
4. The solution evaluation module 514 may recognize the decreasing trend of network traffic and may allow the solution yielded by the solver to be enforced to the ATCA system in order to optimize hardware resources usage.
5. The solution enforcer, e.g. the system configuration enforcer 516, may map the yielded solution to system configuration commands. For example, the system configuration commands may deactivate subsystems which the optimization problem solver 512 has selected as not needed for handling current network traffic demands.

In any one of the above cases, the power management module, e.g. the power reduction module or the power optimization module 502, may incorporate information on cooling systems (air conditioning, ventilation etc.) and may also decide and enforce suitable configurations on such cooling systems. Further, user sessions, e.g. control plane signaling, may be transferred from one subsystem which may be disabled to another subsystem which may remain active. The user session may be transferred from one subsystem which may be disabled to another system which may remain active without a connection loss or a system outage observable to a user.

It should be noted that the term "comprising" does not exclude other elements or steps and the use of articles "a" or "an" does not exclude a plurality. Also elements described in association with different embodiments may be combined. It should also be noted that reference signs in the claims should not be construed as limiting the scope of the claims.

In order to recapitulate the above described embodiments of the present invention one can state:

The embodiments of the present invention may provide decision elements to decide how to allocate traffic handling among ATCA subsystems and their processing units in an ATCA telecommunication system while minimizing the total power consumption of the ATCA system. This may be performed by enabling/disabling ATCA subsystems that might not be needed for processing the current traffic amount served by the ATCA system.

Further, the embedment of the present invention may address the problem of inefficient power utilization in modern ATCA systems. By formulating the ATCA total system consumption as an optimization problem, a method which may be provided which may consider the system load, the current system state (e.g. traffic, number of network connections etc.), the relation between various system states regarding total power consumption and future predictions of resource requirements. In particular, the method may reconfigure resource allocation (power, traffic scheduling etc.) among the ATCA subsystems thereby achieving minimum power consumption.

LIST OF REFERENCE SIGNS 100 telecommunication system
102 ATCA system
104 system manager
106 interconnected blades
108 shelf manager
110 intelligent platform management bus
112 intelligent platform management interface
200 ATCA system
202 power optimization module
208 shelf manager
300 ATCA system
302 power optimization module
400 ATCA system
402 power optimization module
404 system manager entity
500 block diagram
502 power optimization module
504 power optimization module scheduler
506 trigger signal
508 system data collector
509 internal or external databases 510 total system power optimization problem formulator
512 total system power optimization problem solver
514 solution evaluation module
516 system configuration enforcer
518 subsystem
600 block diagram
602 power optimization module
604 power optimization module scheduler
609 internal or external database
610 total system power optimization problem formulator
612 total system power optimization problem solver
614 solution evaluation module
616 system configuration enforcer
618 subsystem
620 subsystem load and subsystem power consumption collector module
622 subsystem profile collector submodule
624 network traffic profile and operator policy collector submodule
626 predictor submodule
628 system hysteresis and system stability evaluator module
700 flow chart
702 receive trigger signal
704 collect system data
706 formulate optimization problem
708 solve optimization problem
710 evaluate stability of a solution
712 enforce system configuration
714 terminate process
800 flow chart
802 start optimization problem formulator module
804 collect available data
806 formulate constraints
808 formulate objective function
810 terminate optimization problem formulator module
900 flow chart
902 receive trigger signal
904 collect system data
906 formulate optimization problem
908 solve optimization problem
910 evaluate stability of a solution
912 enforce system configuration
914 terminate process
916 collect external parameter data
918 predict future parameters
920 evaluate system stability
1000 time line
1002 time t0
1004 time t1
1006 time t2

LIST OF ABBREVIATIONS

AMC: Advanced Mezzanine Card
ATCA: Advanced Telecommunications Computing Architecture
BSC: Base Station Controller
CAPEX: Capital Expenses
CO2: Carbon Dioxide
CPU: Central Processing Unit
ePDG: Evolved Packet Data Gateway
FRU: Field Replaceable Unit
GGSN: Gateway GPRS support node
GMSC: Gateway Mobile Switching Center
IETF: Internet Engineering Task Force
IPMB: Intelligent Platform Management Buses
IPMI: Intelligent Platform Management Interface
ISO: International Organization for Standardization
LTE: Long-Term Evolution
MME: Mobility Management Entity
MSC: Mobile Station Controller
OPEX: Operating Expenses
PGW: Packet Data Network Gateway
PICMG: PCI Industrial Computers Manufacturers Group
RMCP: Remote Management Control Protocol
RNC: Radio Network Controller
RTM: Rear Transition Module
SAE: System Architecture Evolution
SGSN: Serving GPRS support node
SGW: Serving Gateway
ShMC: Shelf management Controller
SLA: Service Level Agreement
SNMP: Simple Network Management Protocol
TTG: Tunneling Termination Gateway

The invention claimed is:

1. A method for reducing power consumption in a telecommunication system, the method comprising:
    collecting system data from at least a part of a plurality of subsystems of the telecommunication system;
    determining a set of system constraints corresponding to the collected system data for at least the part of the plurality of subsystems;
    determining a configuration for at least the part of the plurality of subsystems based on the collected system data so that a total power consumption for at least the part of the plurality of subsystems is reduced and the determined set of system constraints is met; and
    applying the determined configuration to at least the part of the plurality of subsystems to enforce the determined configuration, wherein
    determining the set of constraints comprises formulating an optimization problem, wherein formulating the optimization problem comprises:
        defining the set of system constraints; and
        formulating an objective function of the optimization problem, wherein the objective function minimizes the total power consumption, and wherein the objective function is based on the power consumption in an idle state of at least the part of the plurality of subsystems and the power consumption corresponding to a central processing unit load or a traffic load of at least the part of the plurality of subsystems.

2. The method as set forth in claim 1, the method further comprising:
    evaluating whether the determined configuration meets a predefined stability criterion,
    wherein the determined configuration is only applied if the determined configuration meets the predefined stability criterion.

3. The method as set forth in claim 1, the method further comprising:
    receiving a trigger signal to start collecting system data, wherein the trigger signal is received periodically or based on an event.

4. The method as set forth in claim 1, wherein:
    the system data comprises a power consumption in an idle state and a power consumption corresponding to the central processing unit load or the traffic load; or
    the set of system constraints comprises one or more overload thresholds such as a maximum processing load, a maximum network traffic load, or system limitations regarding the total power consumption.

5. The method as set forth in claim 1, wherein the determining the configuration for at least the part of the plurality of subsystems comprises directly solving the optimization problem using an exhaustive search.

6. The method as set forth in claim 1, wherein determining a configuration for each of the plurality of subsystems comprises solving the optimization problem by minimizing the objective function of the optimization problem with respect to the determined set of system constraints.

7. The method as set forth in claim 1, wherein evaluating whether the determined system configuration meets a predefined stability criterion comprises determining whether a time trend of the collected system data indicates an increase or a decrease of the collected system data without fluctuation.

8. The method as set forth in claim 1, wherein applying the determined configuration comprises:
    translating the determined configuration into one or more system commands for at least the part of the plurality of subsystems;
    sending the one or more system commands to at least the part of the plurality of subsystems so that at least the part of the plurality of subsystems remains operational when applying the determined configuration; or
    configuring one or more cooling systems of at least the part of the plurality of subsystems based on the determined configuration.

9. The method as set forth in claim 8, wherein the system commands comprise at least one of the following system commands:
    switching on a subsystem;
    switching off a subsystem;
    suspending a subsystem in a standby mode;
    resuming a subsystem from a standby mode;
    changing a distribution of processing load; and
    changing a routing of traffic so that a network traffic load is distributed differently.

10. The method as set forth in claim 1, the method further comprising:
    if the determined configuration does not meet a predefined stability criterion:
        discarding the determined configuration; and
        waiting for the next trigger signal to start collecting the system data.

11. The method as set forth in claim 1, wherein the configuration is determined so that the total power consumption for at least the part of the plurality of subsystems is reduced to a minimum total power consumption.

12. The method as set forth in claim 1, wherein at least the part of the plurality of subsystems is fully operational during determining the configuration.

13. The method as set forth in claim 1, the method further comprising:
    predicting future parameters of the system data based on historical data in a predefined time interval.

14. The method as set forth in claim 13, the method further comprising:
    evaluating whether the telecommunication system is in a stable state previous to determining the configuration, wherein evaluating comprises determining whether a continuous change is predicted in the future parameters of the system data.

15. The method as set forth in claim 14, wherein determining the configuration for at least the part of the plurality of subsystems is only initiated if the telecommunication system has been evaluated to be in the stable state, or the method further comprising:
    if the telecommunication system is evaluated not to be in the stable state;
    terminating the method; and
    waiting to receive the next trigger signal.

16. A computer program embodied on a non-transitory computer readable medium, the computer program, when executed by a data processor, controlling or for carrying out the method as specified in claim 1.

17. A telecommunication apparatus, the telecommunication apparatus comprising:
    a plurality of subsystems; and
    a power reduction module configured to reduce power consumption of a plurality of subsystems, the power reduction module comprising:
        a system data collector configured to collect system data from at least a part of the plurality of subsystems;
        a constraint determining unit configured to determine a set of system constraints corresponding to the collected system data for at least the part of the plurality of subsystems;
        a configuration determining unit configured to determine a configuration for at least the part of the plurality of subsystems based on the collected system data so that a total power consumption for at least the part of the plurality of subsystems is reduced and the determined set of system constraints is met; and
        a system configuration enforcer configured to apply the determined configuration to at least the part of the plurality of subsystems to enforce the determined configuration, wherein
    determining the set of constraints comprises formulating an optimization problem, wherein formulating the optimization problem comprises:
        defining the set of system constraints; and
        formulating an objective function of the optimization problem, wherein the objective function minimizes the total power consumption, and wherein the objective function is based on the power consumption in an idle state of at least the part of the plurality of subsystems and the power consumption corresponding to the central processing unit load or the traffic load of at least the part of the plurality of subsystems.

18. The telecommunication system as set forth in claim 17, wherein the telecommunication system is an advanced telecommunications computing architecture system, and wherein the plurality of subsystems comprises a plurality of advanced telecommunications computing architecture subsystems.

19. The telecommunication system as set forth in claim 17, wherein the power reduction module is further configured to reduce power by:
    evaluating whether the determined configuration meets a predefined stability criterion,
    wherein the determined configuration is only applied if the determined configuration meets the predefined stability criterion.

* * * * *